US008042304B2

(12) United States Patent
Contreras

(10) Patent No.: US 8,042,304 B2

(45) Date of Patent: Oct. 25, 2011

(54) GUTTER INSERT

(75) Inventor: Jose D. M. Contreras, West Covina, CA (US)

(73) Assignee: FXI, Inc., Media, PA (US)

( * ) Notice: Subject to any disclaimer, the term of this patent is extended or adjusted under 35 U.S.C. 154(b) by 217 days.

(21) Appl. No.: 12/553,453

(22) Filed: Sep. 3, 2009

(65) Prior Publication Data

US 2011/0047887 A1 Mar. 3, 2011

(51) Int. Cl.
*E04D 13/00* (2006.01)
*B01D 35/02* (2006.01)

(52) U.S. Cl. ................. 52/12; 83/16; 210/474; 210/162

(58) Field of Classification Search ................ 52/11-16, 52/309.4; 83/16; 210/162, 474
See application file for complete search history.

(56) References Cited

U.S. PATENT DOCUMENTS

| | | | |
|---|---|---|---|
| 459,754 A | 9/1891 | King | |
| D103,486 S | 3/1937 | Bonnell | |
| D103,487 S | 3/1937 | Bonnell | |
| D122,817 S | 10/1940 | Ford | |
| 3,256,205 A | 6/1966 | Hurby, Jr. | |
| 3,855,132 A | 12/1974 | Dugan | |
| 4,178,161 A * | 12/1979 | Rudner et al. | 55/524 |
| 4,265,963 A | 5/1981 | Matalon | |
| 4,826,882 A | 5/1989 | Bredbenner et al. | |
| 4,841,686 A | 6/1989 | Rees | |
| D307,637 S | 5/1990 | Kennedy et al. | |
| D309,343 S | 7/1990 | Koza et al. | |
| 4,949,514 A | 8/1990 | Weller | |
| 5,038,530 A | 8/1991 | Watkins | |
| 5,107,635 A | 4/1992 | Carpenter | |
| 5,242,591 A | 9/1993 | Beechert et al. | |
| D347,682 S | 6/1994 | Kennedy et al. | |
| 5,409,602 A | 4/1995 | Sorenson | |
| 5,535,554 A | 7/1996 | Harris, Jr. | |
| 5,536,406 A | 7/1996 | Silva | |
| 5,595,027 A | 1/1997 | Vail | |
| 5,721,281 A | 2/1998 | Blount | |
| D395,072 S | 6/1998 | Mariani | |
| RE36,343 E | 10/1999 | Silva | |
| 6,134,843 A | 10/2000 | Tregear | |
| 6,223,474 B1 | 5/2001 | Kafton | |
| 6,282,845 B1 | 9/2001 | Hines | |
| 6,442,912 B1 | 9/2002 | Phillips et al. | |
| 6,598,352 B2 | 7/2003 | Higginbotham | |
| 6,732,477 B1 | 5/2004 | Richard | |
| 6,932,911 B1 | 8/2005 | Groth et al. | |
| 6,938,379 B2 | 9/2005 | Groom | |
| 7,051,480 B1 | 5/2006 | Dennis | |
| 7,074,326 B2 | 7/2006 | Singleton | |
| 7,200,969 B2 | 4/2007 | Rotter | |

(Continued)

FOREIGN PATENT DOCUMENTS

CH 661312 A5 7/1987

(Continued)

*Primary Examiner* — Brian Glessner
*Assistant Examiner* — Beth Stephan
(74) *Attorney, Agent, or Firm* — Connolly Bove Lodge & Hutz LLP

(57) ABSTRACT

A gutter insert formed of a flexible open cell porous foam has five or more sides and forms an inverted “V” or check-mark shape. Four gutter inserts may be cut from one column of foam material, thereby reducing foam waste. The four gutter inserts may be shipped nested together in columnar form, and separated at the jobsite just before installation.

28 Claims, 4 Drawing Sheets

U.S. PATENT DOCUMENTS

| | | | |
|---|---|---|---|
| 7,208,081 | B2 | 4/2007 | Jones |
| D550,804 | S | 9/2007 | Jones |
| 7,303,687 | B2 | 12/2007 | Groth et al. |
| 7,310,912 | B2 | 12/2007 | Lenney et al. |
| D616,960 | S | 6/2010 | Konkey |
| 7,740,755 | B2 * | 6/2010 | Wilson et al. ................. 210/162 |
| 7,752,811 | B1 * | 7/2010 | Pavlansky ......................... 52/12 |
| 2002/0134029 | A1 | 9/2002 | Groom |
| 2004/0006927 | A1 | 1/2004 | Wickett |
| 2005/0034376 | A1 | 2/2005 | Pourdeyhimi et al. |
| 2005/0145560 | A1 * | 7/2005 | Jones ............................ 210/459 |
| 2005/0178072 | A1 | 8/2005 | Olthoff |
| 2005/0247611 | A1 | 11/2005 | Groth et al. |
| 2006/0037253 | A1 | 2/2006 | Mozeika |
| 2006/0096189 | A1 | 5/2006 | Pavlansky et al. |
| 2006/0117672 | A1 | 6/2006 | Kurple et al. |
| 2006/0278573 | A1 | 12/2006 | Robinson |
| 2009/0178366 | A1 * | 7/2009 | Konkey ........................ 52/745.2 |
| 2009/0249704 | A1 | 10/2009 | Wilson et al. |

FOREIGN PATENT DOCUMENTS

| | | | |
|---|---|---|---|
| DE | 10016447 | A1 | 10/2001 |
| JP | 06117065 | A | 4/1994 |
| JP | 2001152620 | A | 6/2001 |
| JP | 2008290396 | A | 12/2008 |

* cited by examiner

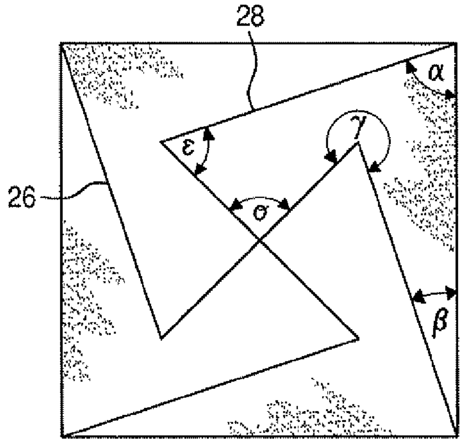
FIG. 4
FIG. 5
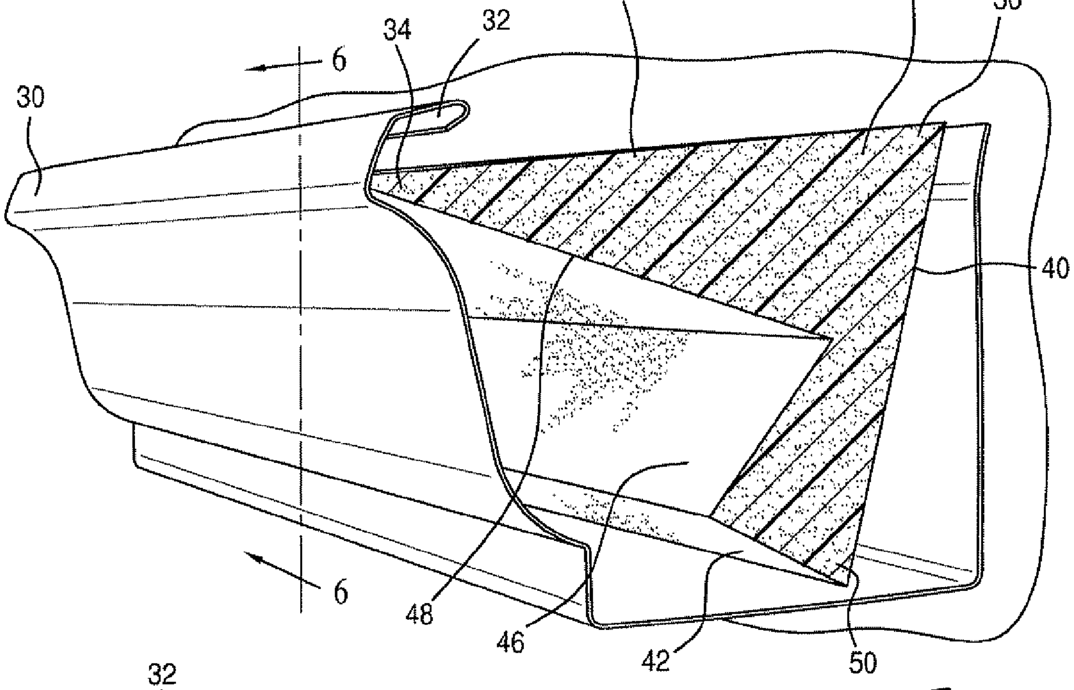
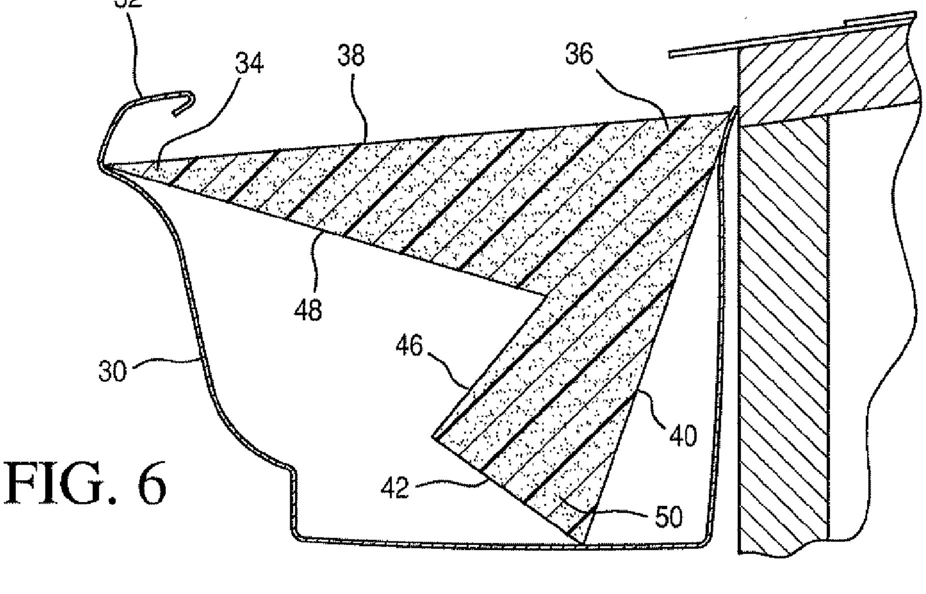
FIG. 6

GUTTER INSERT

FIELD OF THE INVENTION

The present invention relates to rain gutters for houses or the like. More particularly, the present invention concerns a porous structure that is inserted within a rain gutter to prevent the gutter from blocking or clogging with debris, such as leaves or other foreign materials.

BACKGROUND OF THE INVENTION

Rain gutters are commonly installed along the lower edges of a sloping roof under the eaves to catch water draining from the roof. Such gutters can become clogged with debris, such as leaves, twigs, seeds and pods, carried to the roof by wind or gravity and washed into the gutter. This debris fills and clogs the gutters and the gutter downspouts, causing water to overflow out of the gutters and over the eaves.

Many devices have been proposed to prevent gutters from clogging. One type of device mounts a screen or cover to the open, upper portion of the gutter. Such screens or covers are intended to permit water to flow through, while at the same time catching the debris. Unfortunately, over a period of time, the leaves and foreign matter collect on the devices and disrupt, divert or prevent water from flowing through the device into the gutter. Consequently, screen-type devices require periodic cleaning or maintenance to ensure proper operation.

Foam filters for gutter systems have been disclosed. U.S. Pat. No. 7,208,081 shows a gutter foam filter formed from columns of open-pore polyether foam, where the columns have a cross sectional shape of a truncated triangle. The columns are held within the gutter underneath a series of gutter spikes. Such foam must be cut to fit gutters of varying width.

U.S. Pat. No. 4,949,514 concerns a gutter liner formed from solid porous material, such as a reticulated porous polyurethane foam. A flat panel of the porous material is folded into an inverted "U"-shape to define a water channel between the two legs of the inverted "U". Undulations are formed on the top barrier surface. Ridges may be formed on the outer side surfaces of the liner to engage the side walls of the gutter. When installed within a gutter, such liner structure generally includes a spacer means to keep the side walls of the inverted "U"-shape separate from one another to define the water channel.

Other foam gutter protectors or inserts have generally trapezoidal cross-sections, optionally with ridges or projections extending from one or multiple surfaces. Long panels or columns of foam are so shaped by cutting away foam material, which generates foam waste.

Improvements to foam gutter protectors and inserts continue to be sought.

SUMMARY OF THE INVENTION

In a first aspect, an elongated gutter insert has at least five sides in cross-section wherein a first acute angle ($\alpha$) is formed between a generally flat top surface and a rear surface, a second acute angle ($\beta$) is formed between the top surface and a first front surface, a reflex angle ($\gamma$) is formed between the first front surface and the second front surface, a third angle ($\delta$) is formed between the second front surface and a bottom surface, and a fourth acute angle ($\epsilon$) is formed between the rear surface and the bottom surface. Preferably, the first acute angle ($\alpha$) is in the range of about 65 to about 75 degrees, the second acute angle ($\beta$) is in the range of about 15 to about 25 degrees, the third angle ($\delta$) is in the range of about 85 to about 95 degrees, the fourth acute angle ($\epsilon$) is in the range of about 60 to about 70 degrees, and the reflex angle ($\gamma$) is in the range of about 290 to about 310 degrees. The corners between surfaces may be sharp, or may be chamfered, beveled or curved. The top surface of the gutter insert has a width that is longer than or approximately the same as a width of a gutter passageway into which the gutter insert is to be installed.

The gutter insert may be of flexible open pore foam having pore count of about 3 to 25 pores per inch, and density in the range of about 1.0 to 3.5 pounds per cubic foot. Preferably, the foam is reticulated. The foam may have an anti-microbial agent and/or a liquid fire retardant incorporated therein or thereon, or may have a coating thereon that contains one or more of a fire retardant, anti-microbial agent and UV protectant.

In a second aspect, a gutter system comprises a gutter associated with a building roof system and defining a passageway, and a gutter insert inserted in such passageway.

In a third aspect, a gutter insert system has a column of foam having a generally square cross-section that comprises four nested together gutter inserts. Each gutter insert has at least five sides in cross-section with a first acute angle ($\alpha$) formed between a generally flat top surface and a rear surface, a second acute angle ($\beta$) formed between the top surface and a first front surface, reflex angle ($\gamma$) formed between the first front surface and the second front surface, a third angle ($\delta$) formed between the second front surface and a bottom surface, and a fourth acute angle ($\epsilon$) formed between the rear surface and the bottom surface. The gutter inserts of the gutter insert system are separable from one another for installation into a gutter passageway. The gutter inserts are formed by cutting the column of foam with two intersecting "Z" or generally "S" patterns, resulting in four nested together gutter inserts. One or more corners of the gutter inserts may be chamfered, beveled or curved.

In a fourth aspect, a method for making a gutter insert includes the steps of: (a) providing a column of foam having a length and having a generally square cross section, wherein a width of each side of such square is approximately the same as or wider than a width of a gutter passageway into which the gutter insert is to be installed; and (b) slicing the column along its length into four separable gutter inserts. Preferably, the four gutter inserts have substantially identical cross-sectional shapes, and each gutter insert has at least five-sides in cross-section wherein a first acute angle ($\alpha$) is formed between a generally flat top surface and a rear surface, a second acute angle ($\beta$) is formed between the top surface and a first front surface, reflex angle ($\gamma$) is formed between the first front surface and the second front surface, a third angle ($\delta$) is formed between the second front surface and a bottom surface and a fourth acute angle ($\epsilon$) is formed between the rear surface and the bottom surface.

DESCRIPTION OF THE FIGURES

Numerous other objects, features and advantages of the invention shall become apparent upon reading the following detailed description taken in conjunction with the accompanying drawings, in which:

FIG. 4 is a right end elevational view of the column of foam as sliced according to FIG. 2, where the left end elevational view is a mirror image thereof;

FIG. 5 is a right front perspective view of a "K"-type gutter into which a gutter insert according to the first embodiment of the invention has been installed;

FIG. 6 is a cross-sectional view of the gutter and gutter insert of the first embodiment taken along line 6-6 of FIG. 5;

DESCRIPTION OF THE PREFERRED EMBODIMENTS

Figure 1:
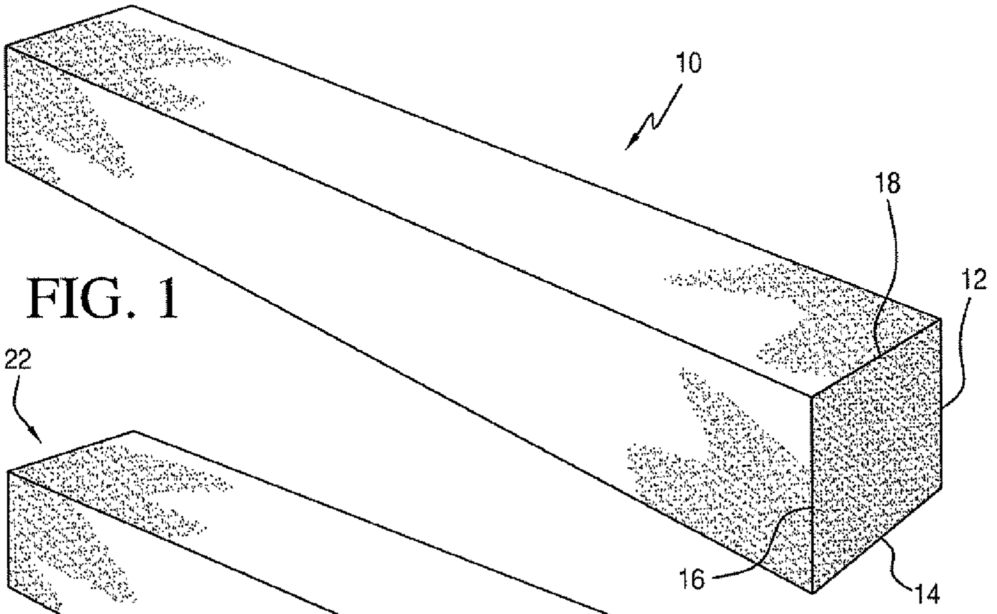
FIG. 1 is a right front perspective view of a column of foam.

With reference to the drawings in which like numerals designate similar elements, gutter inserts 20*a*, 20*b*, 20*c*, 20*d* according to a first embodiment of the invention may be made from a column 10 of foam as shown in FIG. 1. The column 10 has a generally square cross-section with four generally straight sides 12, 14, 16, 18 of approximately the same width. The column 10 may have any length, as desired. A representative suitable length is from 6 feet to ten feet.

Figure 2:
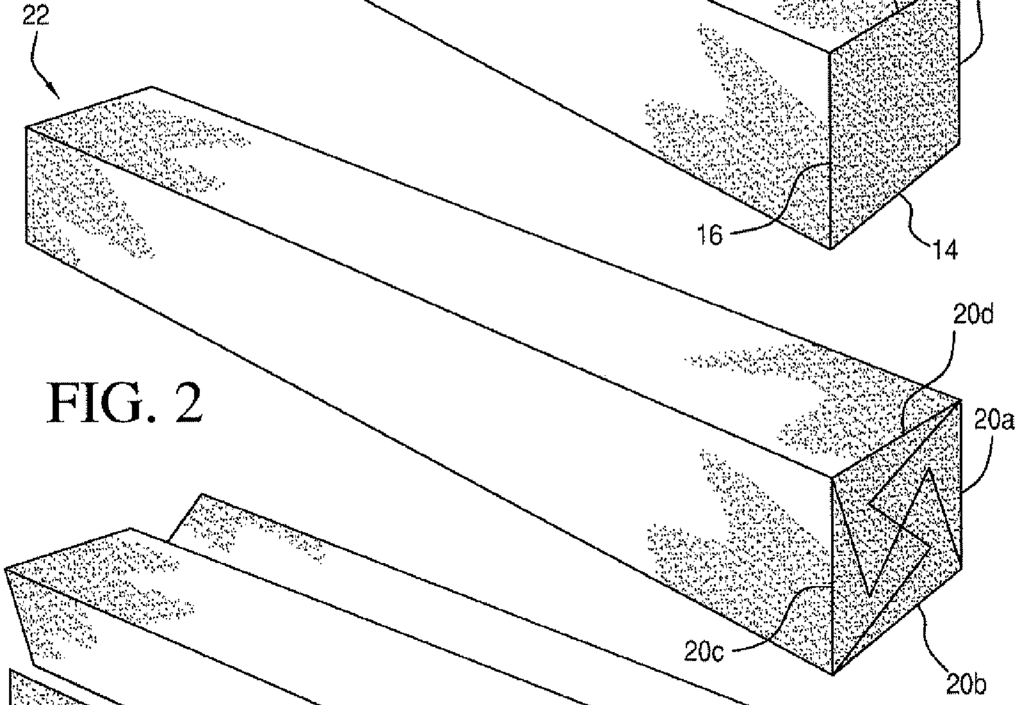
FIG. 2 is a right front perspective view of the column of foam of FIG. 1 that has been sliced to form four gutter inserts according to a first embodiment of the invention.
Figure 3:
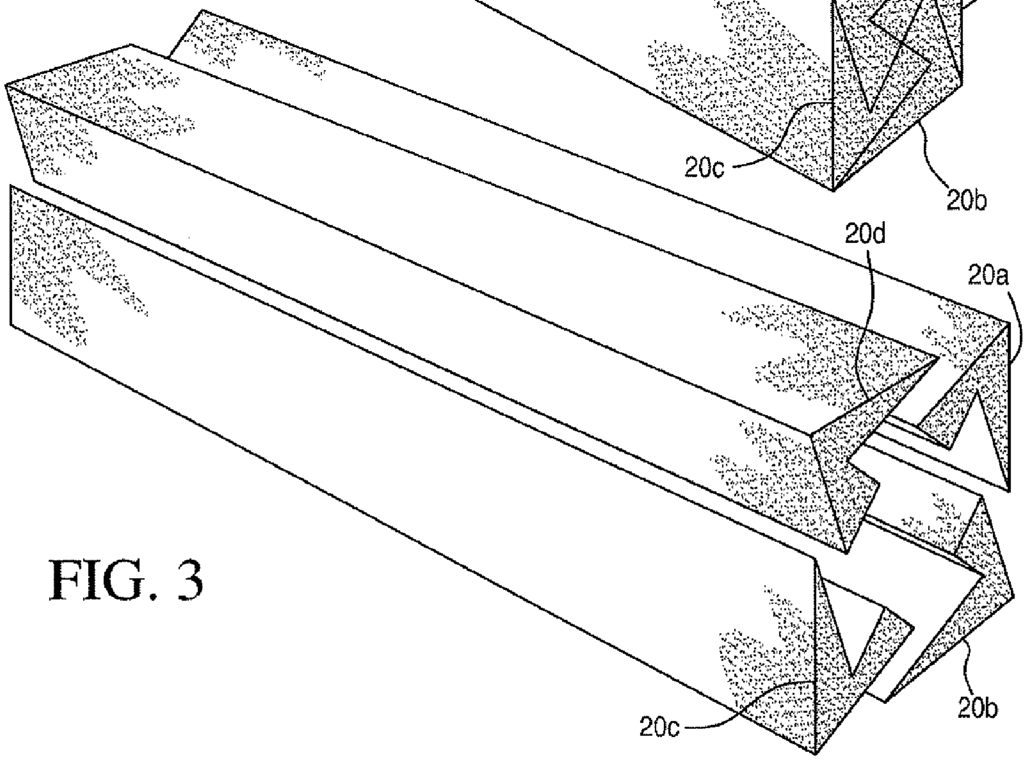
FIG. 3 is a right front perspective view of the four gutter inserts of FIG. 2 as separated apart from one another.

Referring to FIGS. 2 and 3, the column 10 is sliced or cut longitudinally with a blade, a cutting wire, a band knife or other cutting device suitable for cutting compressible material, such as foam. Preferably, the column 10 is cut with a programmable contour cutter, such as model CF 67 from Fecken Kirfel or model OFS from Baumer of America, Inc. A programmable contour cutter may be programmed to cut several columns of foam from one larger foam bun, and sequentially or concurrently make the cuts necessary to form the gutter inserts in such columns.

As shown in FIGS. 2 and 4, cuts are made in column 10 in two "Z" patterns 26, 28 that intersect generally at a midpoint of the square cross-section forming the column 10 to create four gutter inserts 20*a*, 20*b*, 20*c*, 20*d*.

After slicing or cutting the column 10, the four gutter inserts 20*a*, 20*b*, 20*c*, 20*d* may be separated from one another as shown in FIG. 3. By forming the gutter inserts with this cutting method, preferably all foam material forming the column 10 is used in making the four gutter inserts 20*a*, 20*b*, 20*c*, 20*d*, such that no foam material is cut away as waste. This method efficiently produces four gutter inserts from one foam column, thus increasing production output.

Once cut, the four gutter inserts 20*a*, 20*b*, 20*c*, 20*d* may be packaged for shipment to a customer without separating. Thus, a cut column 22 as shown in FIG. 2 can be packaged separately or together with other cut columns for space-saving. The customer may separate the gutter inserts 20*a*, 20*b*, 20*c*, 20*d* from one another at the point of installation.

Each gutter insert 20*a*, 20*b*, 20*c*, 20*d* has a five-sided cross-section wherein a first acute angle ($\alpha$) is formed between a generally flat top surface and a rear surface, a second acute angle ($\beta$) is formed between the top surface and a first front surface, reflex angle ($\gamma$) is formed between the first front surface and the second front surface, a third angle ($\delta$) is formed between the second front surface and a bottom surface and a fourth acute angle ($\epsilon$) is formed between the rear surface and the bottom surface. The first acute angle ($\alpha$) is in the range of about 65 to about 75 degrees, most preferably about 70 degrees. The second acute angle ($\beta$) is in the range of about 15 to about 25 degrees, most preferably about 20 degrees. The reflex angle ($\gamma$) is in the range of about 290 to about 310 degrees, most preferably about 295 degrees. The third angle ($\delta$) is in the range of about 85 to about 95 degrees, most preferably 90 degrees. The fourth acute angle ($\epsilon$) is in the range of about 60 to about 70 degrees, most preferably about 65 degrees. In the preferred embodiment, the gutter insert has a generally off-set "V" or "check-mark" configuration in cross-section.

Referring next to FIGS. 5 and 6, each gutter insert 20, upon being separated from the column 10, may be installed within the interior volume of a gutter 30 to block leaves, twigs, pods, seeds and other debris from entering the gutter. When installed, the gutter insert 20 permits fluids to flow through pores of the foam material, while blocking debris. Each gutter insert 20 is installed so that its generally flat top surface 38 extends along the top opening of the gutter, with a front corner 34 and rear corner 36 in contact with the upstanding gutter 30 walls. The front corner 34 of the gutter insert 20 may seat under the front lip 32 of the front gutter wall. The rear surface 40 of the gutter insert 20 is disposed at an angle to the rear gutter wall, leaving a space between the gutter insert and the rear gutter wall. The bottom corner 50 of the gutter insert 20 contacts the bottom inner surface of the gutter. The bottom surface 42 of the gutter insert 20 is angled with respect to the bottom inner surface of the gutter. Front surfaces 46 and 48 of the gutter insert 20 are spaced a distance from the front wall of the gutter 30. Open volume is left also between the rear surface 40 and the rear wall of the gutter 30. As shown in FIG. 6, a substantial portion of the inner volume within the gutter is not filled with foam material, thus allowing fluids that flow through the gutter insert 20 to flow along the length of the gutter channel in two open chambers (dual open chambers) between the gutter insert and the gutter walls until reaching a gutter downspout (not shown) without obstruction.

Each gutter insert 20 as shown in FIGS. 3, 5 and 6 has sharp pointed corners, such as corners 34, 36. As a possible variation, the gutter insert 20 may be formed with rounded, chamfered or beveled corners.

Figure 7:
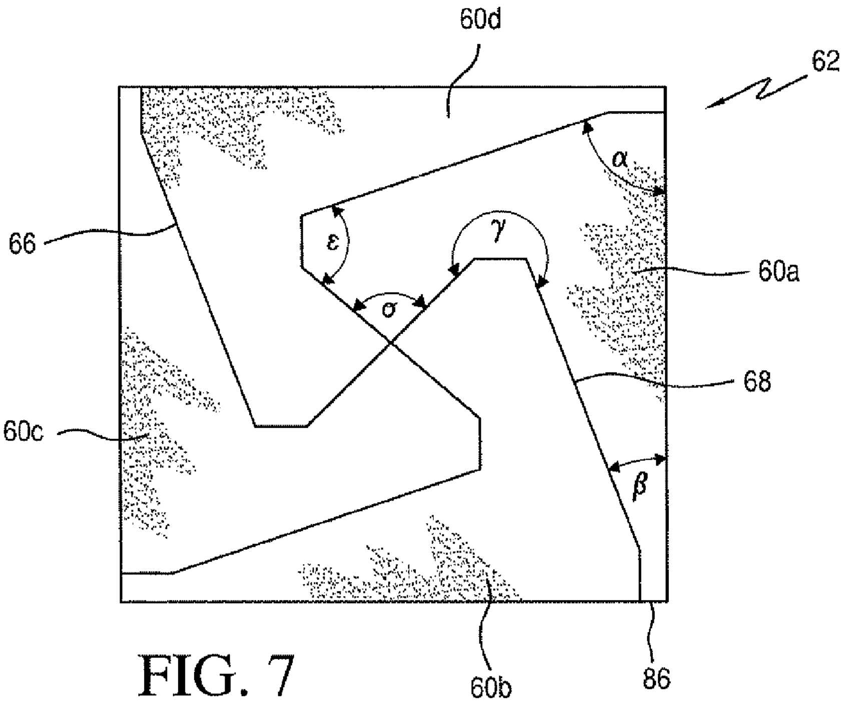
FIG. 7 is a right end elevational view of a column of foam that has been sliced to form four gutter inserts according to a second embodiment of the invention.
Figure 8:
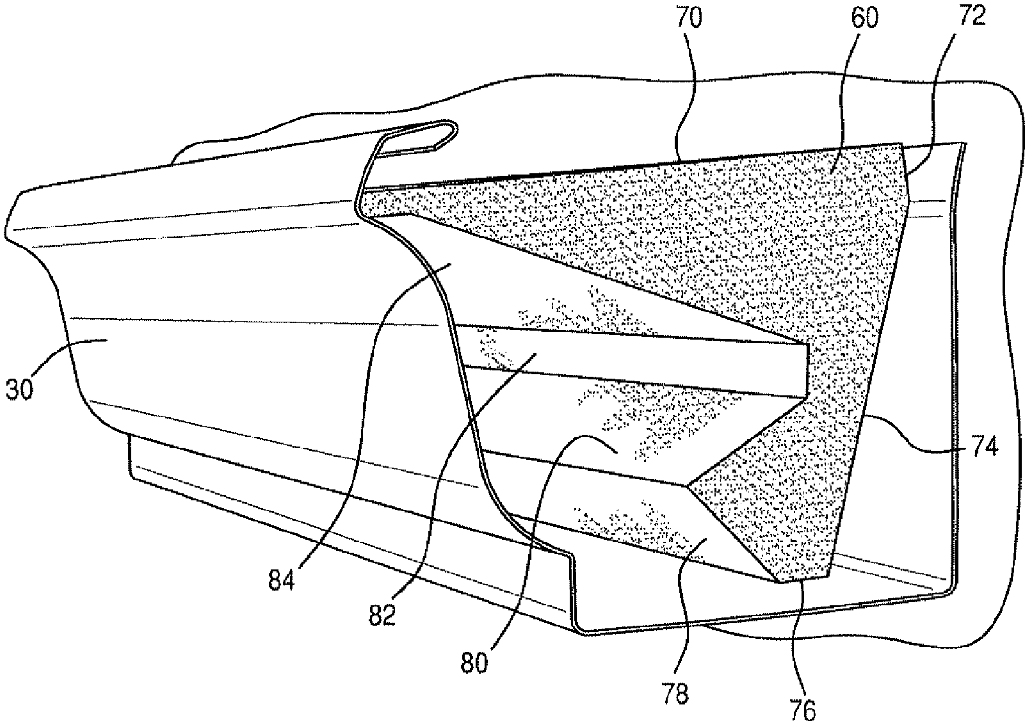
FIG. 8 is a right front perspective view of a "K"-type gutter into which a gutter insert according to the second embodiment of the invention has been installed.

Referring next to FIGS. 7 and 8, a second embodiment of a gutter insert according to the invention is formed by cutting four gutter inserts 60*a*, 60*b*, 60*c*, 60*d* out of a foam column 62. The cutting pattern comprises two intersecting generally "S"-shaped cutting paths 66, 68. Different from the first embodiment (e.g. 20*a*, 20*b*, 20*c*, 20*d*), the gutter insert cutting pattern for the second embodiment forms fewer sharp corners.

Each gutter insert 60*a*, 60*b*, 60*c*, 60*d* has a ten-sided cross-section wherein a first acute angle ($\alpha$) is formed between a generally flat top surface 70 and a rear surface 74, a second acute angle ($\beta$) is formed between the top surface 70 and a first front surface 84, a reflex angle ($\gamma$) is formed between the first front surface 84 and the second front surface 80, a third angle ($\delta$) is formed between the second front surface 80 and a bottom surface 78 and a fourth acute angle ($\epsilon$) is formed between the rear surface 74 and the bottom surface 78. The first acute angle ($\alpha$) is in the range of about 65 to about 75 degrees, most preferably about 71 degrees. The second acute angle ($\beta$) is in the range of about 15 to about 25 degrees, most preferably about 21 degrees. The reflex angle ($\gamma$) is in the range of about 290 to about 310 degrees, most preferably about 294 degrees. The third angle ($\delta$) is in the range of about 85 to about 95 degrees, most preferably about 93 degrees. The fourth acute angle (ϵ) is in the range of about 60 to about 70 degrees, most preferably about 63 degrees.

In addition, in the alternate embodiment of the gutter insert 60, vertical rear surface 72 is interposed between top surface 70 and rear surface 74, and bottom surface 76 is interposed between rear surface 74 and bottom surface 78. Moreover, vertical front surface 86 is interposed between top surface 70 and first front surface 84, and vertical mid surface 82 is interposed between first front surface 84 and second front surface 80. This alternate embodiment 60 has a construction comparable to gutter insert 20, but with some chamfered corner regions. Other variations in the cutting patterns 66, 68 are possible, such as, but not limited to, curved regions rather than chamfered regions.

Figure 9:
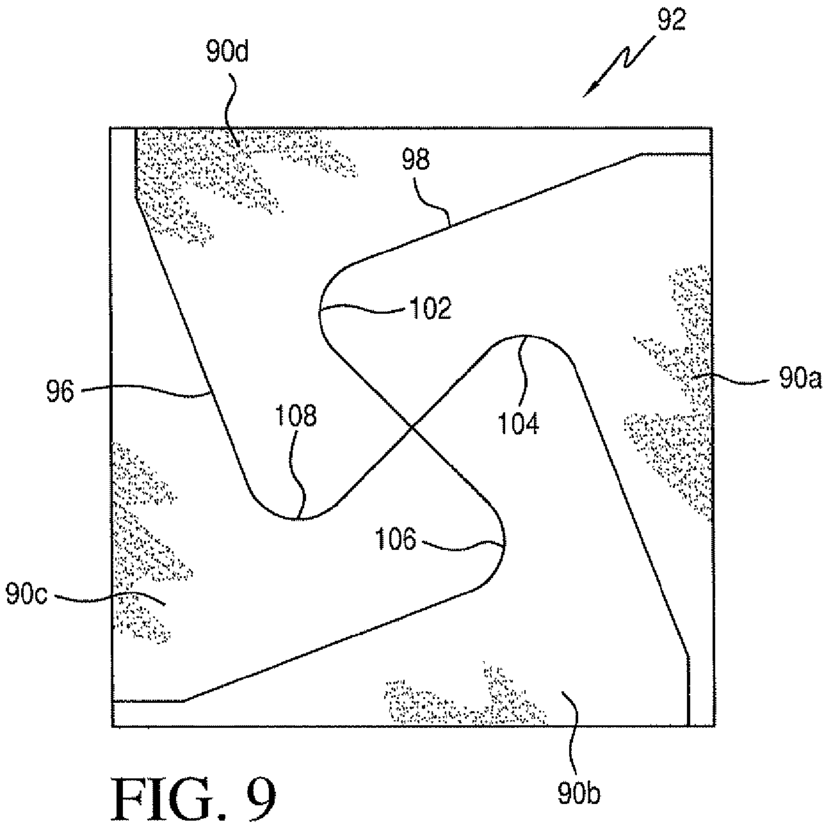
FIG. 9 is a right end elevational view of a column of foam that has been sliced to form four gutter inserts according to a third embodiment of the invention.
Figure 10:
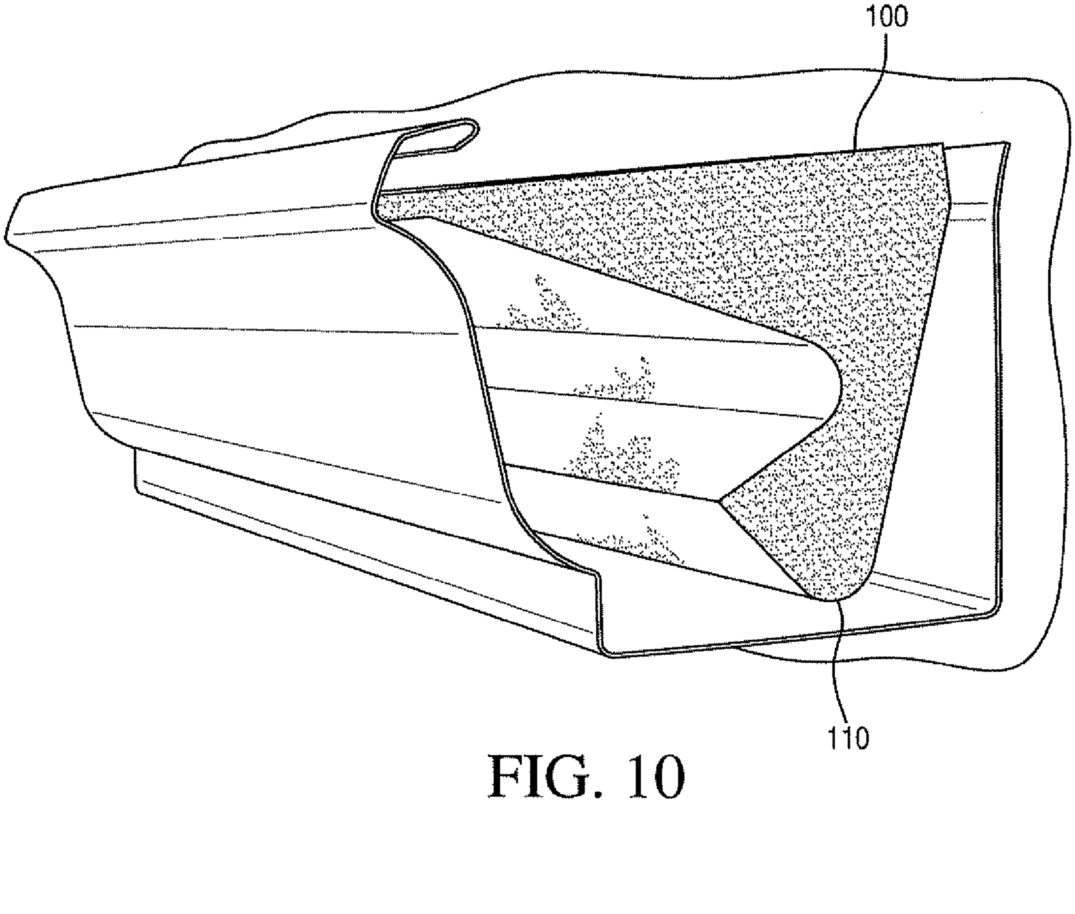
FIG. 10 is a right front perspective view of a "K"-type gutter into which a gutter insert according to the third embodiment of the invention has been installed.

Referring next to FIGS. 9 and 10, a third embodiment of a gutter insert according to the invention is formed by cutting four gutter inserts 90*a*, 90*b*, 90*c*, 90*d* out of a foam column 92. The cutting pattern comprises two intersecting generally "S"-shaped cutting paths 96, 98. Different from the first embodiment (e.g. 20*a*, 20*b*, 20*c*, 20*d*), the gutter insert cutting pattern for the second embodiment forms fewer sharp corners and has curved regions (e.g., 102, 104, 106, 108).

The gutter inserts 20, 60, 90 have generally planar top surfaces 38, 70, 100 that have a width comparable or slightly longer than the gutter opening into which the gutter insert is to be installed. Multiple gutter inserts 20, 60, 90 are installed within a gutter channel in end to end relation to create a barrier to debris, while still permitting fluids, such as rain water, to reach the interior of the gutter channel. Fluids within the interior of the gutter channel may flow through the two open volume spaces left between the front surfaces of the gutter insert and the front gutter wall, and the rear surface(s) of the gutter insert and the rear gutter wail. As such, dual chambers are formed to direct fluids along the gutter channel toward the gutter downspout. One or more additional fluid-directing chambers may be formed by varying the configuration of the bottom corner 50 of gutter insert 20 or the bottom surface 76 of gutter insert 60 or the bottom curved surface 110 of gutter insert 90.

The foam forming the gutter inserts 20, 60, 90 preferably is a flexible, open pore polyether polyurethane foam. The open pore foam permits water or other liquids that impinge on the top surface 38, 70, 100 of a gutter insert 20, 60, 90 to pass therethrough, while filtering or blocking debris, such as leaves or twigs, that may be carried by water along the roof. Such foam may be reticulated to remove cell windows and increase the porosity and liquid permeability of such foam. Thermal or chemical reticulation methods may be used. Pore count or pore size of such foam is preferably between 3 to 25 pores per inch, most preferably between 5 to 15 pores per inch. Foam density is preferably between about 1.0 and 3.5 pounds per cubic foot, or between 1.4 to 3.5 pounds per cubic foot before any coating is applied. If a coating is applied, such coating may increase the density from 10% to 350%, or greater if desired.

Various additives may be incorporated into the foam-forming mixture. For example, one or more liquid fire retardants and anti-microbial additives may be included in situ when forming the foam. In addition, coatings may be applied to the formed foam. For example, one or more UV inhibitors, anti-microbial agents and/or liquid fire retardants may be applied to the foam as a coating or as multiple coatings.

While preferred embodiments of the invention have been described and illustrated here, various changes, substitutions and modifications to the described embodiments will become apparent to those of ordinary skill in the art without thereby departing from the scope and spirit of the invention.

What is claimed is:

1. A gutter insert, comprising:

a flexible, elongated, open pore foam member having a predetermined length and forming a generally "U" or "V" shape in cross-section, said foam member having a generally flat top surface, a rear surface, a bottom surface, a first front surface and a second front surface, wherein a first acute angle (α) is formed between the generally flat top surface and the rear surface, a second acute angle (β) is formed between the top surface and the first front surface, a reflex angle (γ) is formed between the first front surface and the second front surface, a third angle (δ) is formed between the second front surface and the bottom surface, and a fourth acute angle (ϵ) is formed between the rear surface and the bottom surface.

2. The gutter insert of claim 1, wherein the first acute angle (α) is in the range of about 65 to about 75 degrees.

3. The gutter insert of claim 1, wherein the second acute angle (β) is in the range of about 15 to about 25 degrees.

4. The gutter insert of claim 1, wherein the reflex angle (γ) is in the range of about 290 to about 310 degrees.

5. The gutter insert of claim 1, wherein the third angle (δ) is in the range of about 85 to about 95 degrees.

6. The gutter insert of claim 1, wherein the fourth acute angle (ϵ) is in the range of about 60 to about 70 degrees.

7. The gutter insert of claim 1, wherein said gutter insert has more than five sides in cross section.

8. The gutter insert of claim 1, wherein at least one corner between surfaces is chamfered, beveled or curved.

9. The gutter insert of claim 1, wherein the foam member is formed from a reticulated foam.

10. The gutter insert of claim 1, wherein the foam member is formed from a foam that has a pore count of about 3 to 25 pores per inch.

11. The gutter insert of claim 1, wherein the foam member is formed from a foam that has a density in the range of about 1.0 to 3.5 pounds per cubic foot.

12. The gutter insert of claim 1, wherein the foam member is formed from a foam that has incorporated therein or thereon an anti-microbial agent and a liquid fire retardant.

13. The gutter insert of claim 1, wherein one or more coatings are applied to the foam, with such coating(s) containing one or more of a fire retardant, a UV protectant and an anti-microbial agent.

14. The gutter insert of claim 1, wherein the top surface of the foam member has a width that is longer than or approximately the same as a width of a gutter into which the gutter insert is to be installed.

15. A gutter system, comprising:

a gutter associated with a building roof system and defining a passageway; and a gutter insert according to claim 1 installed within said passageway.

16. A gutter insert system, comprising:

a column of flexible, open pore foam having a generally square cross-section, said column comprising four nested together gutter inserts, wherein each said gutter insert forms a generally "U" or "V" shape in cross-section, said gutter insert having a generally flat top surface, a rear surface, a bottom surface, a first front surface and a second front surface, wherein with a first acute angle (α) is formed between the generally flat top surface and the rear surface, a second acute angle (β) is formed between the top surface and the first front surface, a reflex angle (γ) is formed between the first front surface and the second front surface, a third angle (δ) is formed between the second front surface and the bottom surface and a fourth acute angle (ϵ) is formed between the rear surface and the bottom surface.

17. The gutter insert system of claim 16, wherein the column is cut with two intersecting "Z" patterns to form the four nested together gutter inserts.

18. The gutter insert system of claim 16, wherein the column is cut with two intersecting generally "S" patterns to form the four nested together gutter inserts.

19. The gutter insert system of claim 16, wherein the gutter inserts are separable from one another for installation into a gutter passageway.

20. The gutter insert system of claim 16, wherein each gutter insert has more than five sides.

21. The gutter insert system of claim 16, wherein at least one corner between surfaces of at least one gutter insert is chamfered, beveled or curved.

22. The gutter insert system of claim 16, wherein the foam is reticulated.

23. The gutter insert system of claim 16, wherein the foam has a pore count of about 3 to 25 pores per inch.

24. The gutter insert system of claim 15, wherein the foam has a density in the range of about 1.0 to 3.5 pounds per cubic foot.

25. The gutter insert system of claim 15, wherein the foam has incorporated therein or thereon an anti-microbial agent and a liquid fire retardant.

26. The gutter insert system of claim 15, wherein one or more coatings are applied to the foam, with such coating(s) containing one or more of a fire retardant, a UV protectant and an anti-microbial agent.

27. A method for making gutter inserts, comprising:

providing a column of foam having a length and having a generally square cross section, wherein a width of each side of such square is approximately the same as or wider than a width of a gutter passageway into which the gutter insert is to be installed; and slicing the column along its length into four gutter inserts having identical or substantially identical cross-sections, wherein each gutter insert has a generally "U" or "V" shape in cross-section and a generally flat top surface, a rear surface, a bottom surface, a first front surface and a second front surface, wherein a first acute angle (α) is formed between the generally flat top surface and the rear surface, a second acute angle (β) is formed between the top surface and the first front surface, reflex angle (γ) is formed between the first front surface and the second front surface, a third angle (δ) is formed between the second front surface and the bottom surface and a fourth acute angle (ϵ) is formed between the rear surface and the bottom surface.

28. The method of claim 27, further comprising separating the sliced column into four gutter inserts.

* * * * *